Fig. 1

Feb. 13, 1945.  E. BOECKING  2,369,207
INTERMITTENT FILM FEEDING MECHANISM FOR
MOTION PICTURE PROJECTION MACHINES
Original Filed May 31, 1941   2 Sheets-Sheet 2
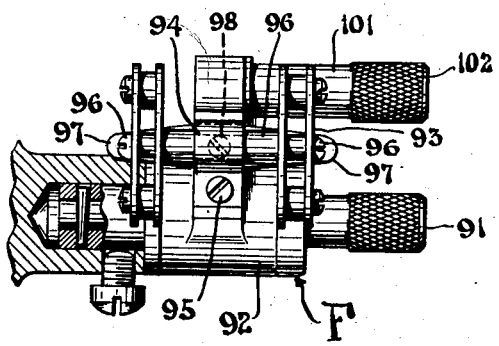
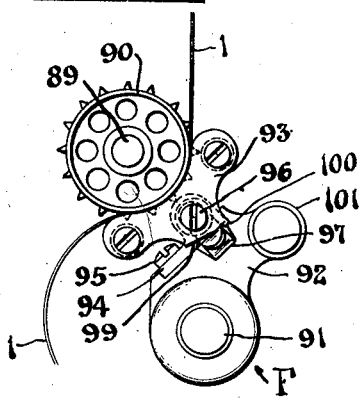
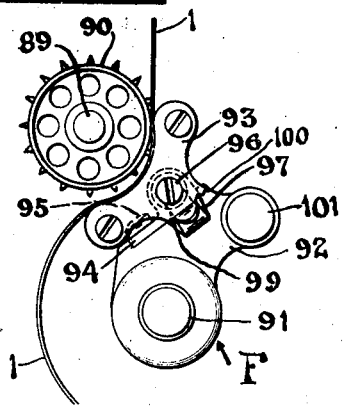
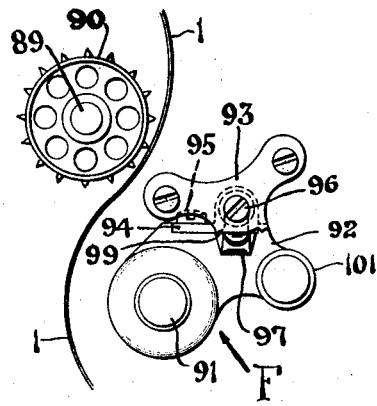
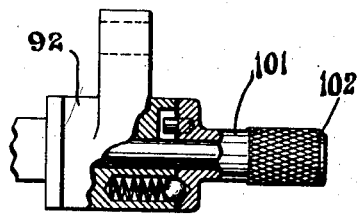
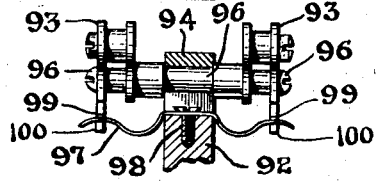
INVENTOR
EWALD BOECKING
Darley & Darley
ATTORNEYS Patented Feb. 13, 1945

2,369,207

UNITED STATES PATENT OFFICE 2,369,207

INTERMITTENT FILM FEEDING MECHANISM FOR MOTION PICTURE PROJECTION MACHINES

Ewald Boecking, Great Kills, Staten Island, N. Y., assignor to Century Projector Corporation, Brooklyn, N. Y., a corporation of New York Original application May 31, 1941, Serial No. 396,060. Divided and this application January 15, 1942, Serial No. 426,847

5 Claims. (Cl. 88—17)

This application is a division of my co-pending application, Serial No. 396,060, filed May 31, 1941. The improved intermittent film feeding mechanism comprising the invention described and claimed herein may be used in connection with motion picture projection machines of the type described in said above referred to application, and also in other similar types of machines.

The invention relates to a new and improved construction for the intermittent film feeding mechanism of motion picture projection machines.

The main object of the invention is to provide an improved construction for the intermittent film feeding mechanism of a motion picture projection machine.

A further object is to provide a new and improved intermittent film feeding mechanism for a motion picture projection machine which is adapted to be positioned in the machine as a complete operating unit.

Various other objects and advantages of the invention will be apparent from the following description taken in connection with the accompanying drawings.

Although the novel features of the invention will be particularly pointed out in the claims, the invention itself, as to its objects and advantages, may be better understood by referring to the following description taken in connection with the accompanying drawings forming a part thereof and in which—

Figure 1 is a side elevation of the interior of that side of a motion picture projection machine which supports the film handling elements of the machine and showing the improved intermittent film feeding mechanism of my invention in position with respect to the other mechanism.

Figure 2 is a plan view of the intermittent film feeding and pad shoe mechanism of my invention;

Figure 3 is a side elevation showing the intermittent film feeding sprocket and pad shoe mechanism in operating position;

Figure 4 is a view similar to Figure 3 but showing the parts as they would be positioned just prior to their being placed into operating position;

Figure 5 is a similar view showing the intermittent film feeding sprocket and pad shoes with the parts in the open position;

Figure 6 is a detail view partly in section showing the pivoting stud of the intermittent film feeding sprocket and pad shoe mechanism;

Figure 7 is a detail view showing the spring action of the shoe of the intermittent film sprocket and shoe mechanism.

Like reference characters denote like parts in the several figures of the drawings.

Figure 1:
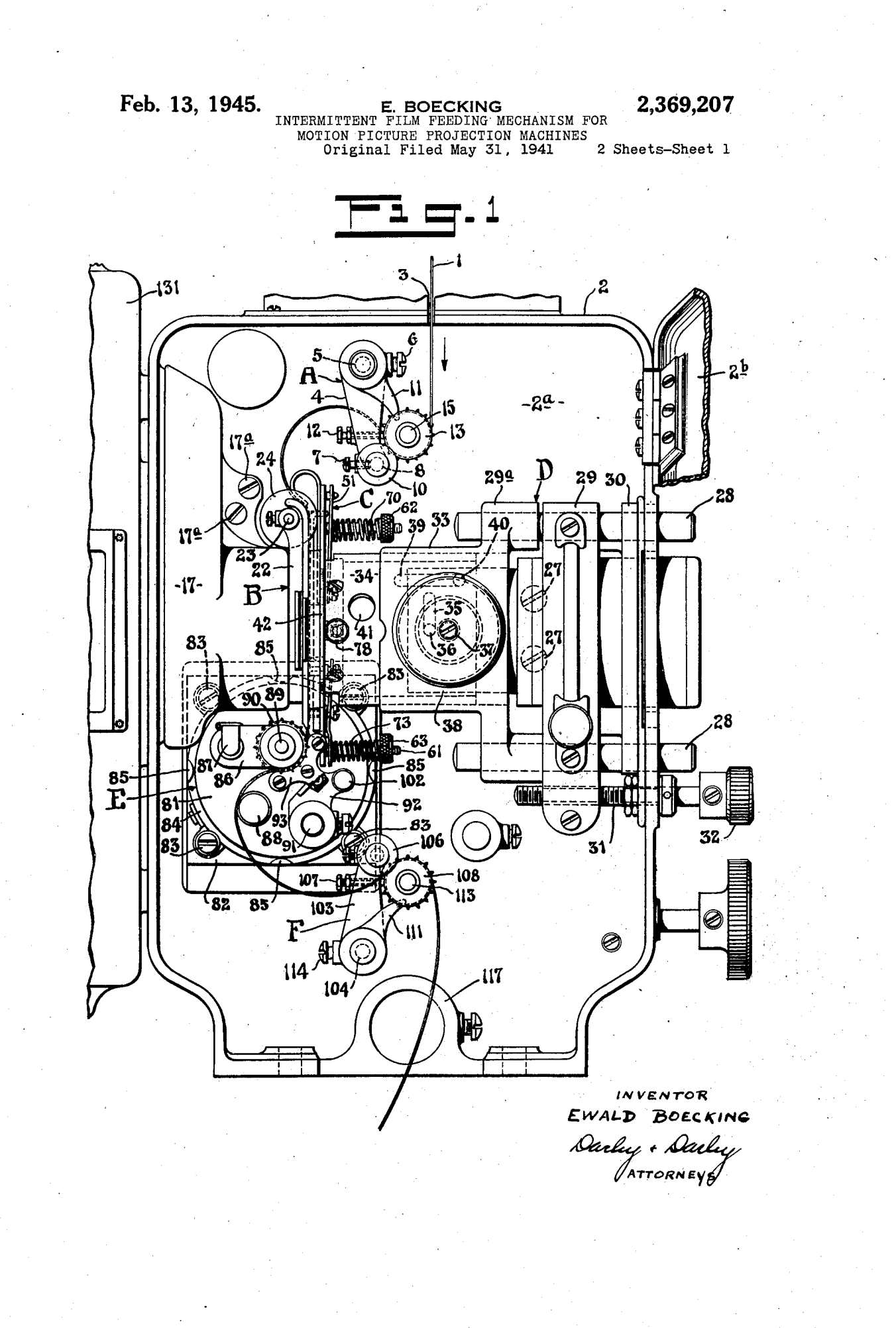

My improved intermittent film feeding mechanism may be employed in a motion picture projection machine of the character illustrated in Figure 1 of the drawings. Referring to this figure, it will be seen that the machine, on the side thereof which houses the film handling elements, is provided with the following main assemblies of operating mechanisms. The upper film sprocket and stripper mechanism of the machine is designated generally by the letter A; the film trap is indicated at B; the film gate at C; the lens mount and film gate supporting means at D; the intermittent film feeding mechanism at E; and the lower sprocket and stripper mechanism at F.

In the normal operation of the machine containing my improved intermittent film feeding mechanism therein, the film indicated at 1 is fed into the machine through an opening 3 provided in the top of the casing 2, and passes around the upper sprocket 13 of the sprocket and stripper mechanism A, then down through the film trap B and between said film trap and the film gate C, then around the sprocket 90 of the intermittent film feeding mechanism E, then around the lower sprocket 108 of the lower sprocket and stripper mechanism F, and then out of the lower portion of the projector and into the lower magazine or to the sound unit.

Before the film is positioned in the machine with respect to the above mentioned film handling elements, and in order that the threading of the film through the machine will be facilitated, the pad roller arm 4 of the upper film sprocket and stripper mechanism A is caused to be swung to its open position away from the sprocket wheels 13; the film gate C is placed in its retracted position away from the film trap B; the arm 92 of the intermittent film feeding mechanism E is caused to be swung to its open position as shown in Figure 5; and the pad roller arm 103 of the lower film sprocket and stripper mechanism is moved to its open position. After the film has been positioned in the machine with respect to the film handling elements, as above explained, the several above-mentioned devices of the film handling mechanisms are caused to be swung into their respective closed operative positions with respect to the film, and as clearly illustrated in Figure 1, the projector is then in condition to automatically advance the film therethrough.

A detailed description of the construction and operation of the film sprocket mechanism, the film trap and other parts of the motion picture projection machine illustrated in Figure 1 of the drawings will not be set forth herein and the present description will be confined to the construction and operation of the intermittent film feeding mechanism which comprises the invention claimed herein. The other mechanisms and their manner of operation have been fully illustrated and described by the same numerals as appear in Figure 1, in my copending application, Serial No. 396,060, filed May 31, 1941.

Referring to the structures comprising the present invention it will be noted by reference to Figure 1 of the drawings that the intermittent film feeding mechanism is designated generally by the letter E. This mechanism is mounted at the lower part of casing 2 as one compact unit on a base 81 which is secured by four screws 83 on the intermittent carriage indicated at 82. The screws 83 are adapted to hold the flange 84 of said base 81 to said intermittent carriage. The flange 84 on base 81 is provided with notches 85 around its periphery, and by turning said base in a clockwise direction, after loosening up the screws 83, and until said notches 85 register with the heads of said screws, the entire intermittent movement mechanism, mounted on the base 81, may be removed from the machine. Of course, it is to be understood, that in order to effect the removal of this unit, it is also necessary to disconnect the flywheel of the machine which is positioned and operates on the other side of the interior wall of casing 2.

The intermittent movement mechanism, as shown in the drawings, is provided with an arm extending forwardly from the base 81 and which terminates with a right angle extension arm 86. Mounted on this extension arm is an oil cup and feed 87 for supplying lubrication to the intermittent movement mechanism. There is also provided an opening 88, in base 81, which is closed with a glass covered window, and which affords an oil sight to indicate the level of the oil being used to lubricate the mechanism.

Supported between the extension arm 86 and the base 81 of the unit is a rotatable shaft 89, upon which is mounted the intermittent sprocket wheels 90. Also mounted on the base 81 and extending forwardly therefrom is a shaft 91, on which is rotatively mounted the sprocket pad shoe arm 92, and upon which is mounted the pad shoes 93. Pad shoes 93 are rotatively supported on the shoe arm 92 by means of a bracket 94, held to arm 92 by a screw 95.

Referring to Figures 2 to 7 of the drawings, it will be seen that the film guide pad shoes 93 are adapted to be rotated on shaft 91 to bring them into contact with the film and so that they will hold said film against the sprocket 90 (see Figure 3). The pad shoes are mounted on a pin 96 which is rotatively held in bracket 94 and are adapted to adjust themselves to a correct position with respect to sprocket wheels 90 when brought into association with said wheels, and assume a position with respect to said wheels as shown in Figures 1 and 3. The movement from inoperative to operative position of the pad shoes 93 is clearly shown starting with Figure 5 and then through Figures 4 and 3. In Figure 5 the pad shoes are shown in their retracted or inoperative position. In Figure 4 the pad shoes are illustrated as positioned at the point where they have assumed almost their full operative position with respect to the sprocket wheel 90. In Figure 3 the pad shoes are shown in full operative position with respect to the sprocket wheels 90.

Referring to Figure 7 it will be noted that a leaf spring 97 is secured to the shoe arm 92 at the point where said pad shoes 93 are positioned. The spring 97 is secured to arm 92 by means of a screw 98 and is adapted to engage against the lower edges 99 of the pad shoes and so as to yieldingly hold said shoes against excessive rotation in the bracket 94. The said lower edges 99 are formed with a depending lug 100, at one end thereof, which forms a stop which engages with said spring to prevent rotation of said pad shoes around the pin 96.

It will be seen that by reason of the manner in which the pad shoes 93 are yieldingly and rotatably mounted they will always clear the sprocket wheels 90 and will also always rotate sufficiently to find their correct position when they are operated to bring them into operative or inoperative position with respect to the sprocket wheels.

The arm 92 of this mechanism is provided with an extension arm 101 which in turn is formed with a knurled end 102 for manipulating said arm to effect an opening and closing of the pad shoes 93 with respect to the sprocket wheels 90.

While the intermittent film feeding mechanism of my invention has been described in detail it is to be understood that though shown in its present preferred form it is not to be limited to such details and form since many changes and modifications may be made in the same without departing from the spirit and scope of the invention. Hence it is desired to cover any and all forms and modifications of the invention which may come within the language or scope of any one or more of the appended claims.

What is claimed is:

1. In a motion picture projecting machine, means for feeding film through the same including intermittently operated film feeding mechanism assembled as a complete operating unit and comprising a base support having mounted thereon spaced sprocket wheels, spaced pad shoes adapted to cooperate with said sprocket wheels in feeding the film, means for manually positioning said pad shoes in and out of operative connection with said sprocket wheels, means for pivotally supporting said pad shoes on said pad positioning means to permit the pad shoes to independently adjust themselves with respect to said sprocket wheels when brought into association therewith, resilient means associated with the pad positioning means for engaging with said pad shoes to resiliently restrict the adjusting action thereof, means on said base support for securing the same in operative position in the machine, and means provided around the periphery of the base support for releasing the same from said securing means when said base support is rotated.

2. In a motion picture projection machine, means for feeding film through the same including intermittently operated film feeding mechanism assembled on a base support as a complete operating unit, and comprising a rotatable shaft supported in an extension formed on said base, spaced film feeding sprocket wheels fixedly secured to said shaft, a shaft secured to said base support and extending outwardly therefrom and positioned adjacent to said sprocket wheel shaft, an arm rotatably supported on said shaft, spaced pad shoes pivotally mounted on said arm and adapted to cooperate with said sprocket wheels in feeding the film, means secured to the lower end of said arm for rotating the same and said pad shoes towards and from said sprocket wheels means for permitting said pad shoes to pivotally move to adjust themselves in correct aligned position with respect to said sprocket wheels when brought into association therewith, resilient means mounted on said pad shoe arm and contacting said pad shoes for resiliently restricting the pivoting action of said pad shoes, means provided on said pad shoes for engaging said resilient means to limit the rotation of said shoes, a flange formed on said base support for securing said support in operative position in the machine, and means formed in said flange for permitting the release of said base support from its secured position in the machine.

3. In a motion picture projection machine, an intermittently operated film feeding mechanism assembled as a complete operating unit on a supporting element, said supporting element having mounted thereon in associated relation with each other, a rotatable shaft having spaced film sprocket wheels secured thereto, a rotatable pad shoe arm having spaced pad shoes rotatably secured thereto and also means to resiliently oppose the rotative movement of the pad shoes, means for securing the base of the supporting element for intermittently operated film feeding mechanism to the machine, and means provided around the periphery of the base of the supporting element for releasing said base from said securing means when said base is rotated.

4. In a motion picture projection machine, an intermittently operated film feeding mechanism assembled as a complete operating unit on a supporting element, said supporting element having mounted thereon means for supporting film sprocket wheels, film sprocket wheels rotatively mounted on said supporting means, a rotatively supported means having spaced pad shoes rotatively secured thereto and positioned so that it can be rotated to position the pad shoes in operative relation with respect to the film sprocket wheels, means for securing the base of the supporting element for the intermittently operated film feeding mechanism to the machine, and notches provided around the periphery of the base of the supporting element for releasing said base from said securing means when said base is rotated and said notches are made to coincide with the securing means.

5. In a motion picture projection machine, an intermittently operated film feeding mechanism assembled as a complete operating unit on a supporting element secured to the machine, said supporting element having an extension formed thereon in which is supported a rotatable shaft to which spaced sprocket wheels are secured, and a shaft secured thereto and extending outwardly therefrom having an arm rotatively supported thereon and upon which is pivotally mounted a pair of spaced pad shoes, means formed thereon for manually rotating the pad shoes so that they may be brought into operative position with respect to the sprocket wheels, and means formed on the base of the supporting element for effecting the removal of the same from the machine when said base is rotated.

EWALD BOECKING.